US009905131B2

(12) United States Patent
Lai (10) Patent No.: US 9,905,131 B2
(45) Date of Patent: Feb. 27, 2018

(54) ONBOARD VEHICLE NOTIFICATION SYSTEM (71) Applicant: THUNDER POWER NEW ENERGY VEHICLE DEVELOPMENT COMPANY LIMITED, Central (HK)

(72) Inventor: Sheng-Fu Lai, Taoyuan (TW)

(73) Assignee: THUNDER POWER NEW ENERGY VEHICLE DEVELOPMENT COMPANY LIMITED, Central (HK)

( * ) Notice: Subject to any disclaimer, the term of this patent is extended or adjusted under 35 U.S.C. 154(b) by 0 days.

(21) Appl. No.: 14/983,461

(22) Filed: Dec. 29, 2015

(65) Prior Publication Data
US 2017/0186320 A1    Jun. 29, 2017

(51) Int. Cl.
| G06F 19/00 | (2011.01) |
| G06G 7/70 | (2006.01) |
| G08G 1/16 | (2006.01) |
| H04L 29/08 | (2006.01) |
| H04W 84/04 | (2009.01) |

(52) U.S. Cl.
CPC ............ *G08G 1/164* (2013.01); *G08G 1/166* (2013.01); *H04L 67/12* (2013.01); *H04W 84/042* (2013.01)

(58) Field of Classification Search
CPC combination set(s) only.
See application file for complete search history.

(56) References Cited

U.S. PATENT DOCUMENTS

| 6,714,894 | B1 * | 3/2004 | Tobey ................... G06Q 40/00 702/182 |
| 6,819,245 | B1 * | 11/2004 | Dilling ................. B60R 25/102 340/435 |
| 7,389,178 | B2 * | 6/2008 | Raz ...................... G09B 19/167 340/903 |
| 2002/0080013 | A1 | 6/2002 | Anderson et al. |

(Continued)

FOREIGN PATENT DOCUMENTS

FR      3015099 A1      6/2015

OTHER PUBLICATIONS

European Search Report for EP 16202823 dated May 4, 2017, 10 pages.

*Primary Examiner* — Bhavesh V Amin
(74) *Attorney, Agent, or Firm* — Kilpatrick Townsend & Stockton LLP (57) ABSTRACT

Described herein is an onboard vehicle system configured to capture vehicle information and notify an operator of the onboard vehicle system of potentially dangerous vehicles. In some embodiments, the onboard vehicle system may capture image information related to its surroundings. The image information may be processed to identify one or more vehicle identifiers associated with vehicles in the vicinity of the onboard system. The onboard system may provide vehicle identifiers to a service provider computer, which may subsequently query one or more driver behavior databases for anomalous behavior related to the vehicle identifiers. Upon detecting anomalous behavior for a target vehicle, the service provider computer may generate one or more notifications to be presented to the operator of the onboard system with regard to the target vehicle. In some embodiments, the onboard system may present the notification to the operator in an audio and/or visual format.

19 Claims, 6 Drawing Sheets

(56) References Cited

U.S. PATENT DOCUMENTS

| | | | |
|---|---|---|---|
| 2002/0198632 A1* | 12/2002 | Breed | B60N 2/2863 701/1 |
| 2003/0182055 A1* | 9/2003 | Curatolo | G01S 5/0036 701/468 |
| 2003/0191568 A1* | 10/2003 | Breed | B60W 40/06 701/36 |
| 2004/0260470 A1* | 12/2004 | Rast | G06Q 10/06 701/300 |
| 2005/0116829 A1* | 6/2005 | Koenig | B60R 16/0231 340/576 |
| 2005/0125117 A1* | 6/2005 | Breed | G07C 5/008 701/31.5 |
| 2007/0001831 A1* | 1/2007 | Raz | B60R 16/0231 340/439 |
| 2007/0027583 A1* | 2/2007 | Tamir | G06Q 30/0283 701/1 |
| 2007/0038351 A1* | 2/2007 | Larschan | G06Q 10/06 701/33.4 |
| 2007/0038352 A1* | 2/2007 | Larschan | G06Q 10/06 701/33.4 |
| 2007/0038353 A1* | 2/2007 | Larschan | G07C 5/085 701/33.4 |
| 2008/0262670 A1* | 10/2008 | McClellan | G01S 5/0027 701/31.4 |
| 2009/0207046 A1* | 8/2009 | Arrighetti | G06K 9/3258 340/937 |
| 2009/0287374 A1* | 11/2009 | Kuramori | A61B 5/0492 701/41 |
| 2012/0182159 A1* | 7/2012 | Alipour | G08G 1/096725 340/928 |
| 2014/0170602 A1* | 6/2014 | Reed | G09B 19/167 434/62 |
| 2014/0376778 A1 | 12/2014 | Muetzel et al. | |
| 2015/0178578 A1* | 6/2015 | Hampiholi | G08G 1/166 348/149 |
| 2015/0206436 A1 | 7/2015 | Hubbard et al. | |
| 2015/0317523 A1 | 11/2015 | Clark et al. | |
| 2016/0150070 A1 | 5/2016 | Goren et al. | |

* cited by examiner

ONBOARD VEHICLE NOTIFICATION SYSTEM

BACKGROUND

A number of factors can make driving on roads unsafe. One such factor, the driving behavior other drivers, cannot be anticipated. Some drivers may drive recklessly, and may subsequently create a hazard for other drivers on the road. It might be possible to avoid these drivers if the reckless drivers could be identified. However, a driver is often unable to watch the behaviors of every other driver around him or her, as that would require taking focus away from driving the vehicle.

SUMMARY

The present disclosure solves these and other problems with the current technology. In particular, the disclosure provides an onboard vehicle system capable of warning the driver of a potentially dangerous vehicle. In some embodiments, a service provider may maintain behavior information related to a plurality of vehicles. Upon identifying a vehicle within its vicinity, the onboard system may provide the service provider computer with the identified vehicle identifier. The service provider computer may, in response, query the vehicle identifier and provide driving behavior information related to the vehicle. The operator of the onboard system may then be warned if the vehicle is associated with a high accident risk. In another exemplary embodiment, the service provider may receive an indication of the onboard system's location. The service provider may identify one or more vehicles within the vicinity of the onboard system based on the provided location information. Upon querying each of the vehicles within the vicinity of the onboard system, the service provider computer may provide the onboard system with information related to driving behavior of the nearby vehicles.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing specific embodiments of the invention, some terms may be described in detail.

An "anomalous behavior" is any behavior by a driver that deviates from current traffic regulations. For example, traveling at a speed above or below the current speed limit may be an anomalous behavior. In another example, crossing a centerline of a road when it is not legal to do so may be an anomalous behavior. Anomalous behavior may include swerving, driving erratically, driving too fast, driving too slow, driving outside of the bounds of a road, or any other unexpected or illegal driving behavior.

An "onboard system" may be any system housed within a vehicle. For example, an onboard system may include a number of input sensors, a processor device capable of processing data from the input sensors, a transmission means (e.g., a wireless platform), and any other suitable component. In some embodiments, the onboard system may be in communication with one or more component external to the onboard system.

A "target vehicle" may be any vehicle for which the onboard system is collecting data. An onboard system may collect data for multiple target vehicles simultaneously. In some embodiments, the vehicle in which the onboard system is installed may be a target vehicle. The onboard system may identify a target vehicle and associate each of the vehicle's movements with the identified target vehicle. Additionally, the onboard system may report movements made by the target vehicle to a service provider computer.

In some embodiments, an onboard vehicle system may utilize one or more input sensors to identify vehicles within its vicinity. Once identified, the onboard system may communicate with the service provider to identify potentially dangerous drivers within the vicinity of the onboard system. In some embodiments, the service provider may maintain a database of driver behavior. Upon receiving an indication of a vehicle identifier, the service provider may query information related to the vehicle identifier to determine a risk associated with the vehicle identifier. Upon determining that the vehicle identifier is associated with a high risk, the service provider may cause the onboard system to provide a warning or other indicator. In some embodiments, a processor device included in the onboard system may identify one or more vehicle identifiers associated with vehicles within its vicinity. The onboard system may include a memory containing vehicle identifier information and/or vehicle behavior information. The processor device of the onboard system may access the memory to identify a behavior and/or risk associated with a target vehicle. Upon identifying the behavior, the processor device may determine a risk associated with the target vehicle based on the behavior information.

In some embodiments, an onboard system may receive input from a global positioning system (GPS) included in the onboard system. The GPS device may provide coordinate information for the onboard system. Upon transmitting this information to a service provider computer, the service provider computer may query a driver database to identify one or more vehicles currently within the vicinity of the onboard system. In some embodiments, the service provider may then determine which of the identified vehicles are associated with a high risk or anomalous behavior. Upon determining that the vehicle identifier is associated with a high risk, the service provider may cause the onboard system to provide a warning or other indicator to the operator of the onboard system. In some embodiments, this identification of the risk associated with a target vehicle may be done by the processor device. In some embodiments, the processor device of the onboard system may determine that one or more of the identified vehicles are associated with a high risk or anomalous behavior based on information provided to the processor device by the service provider computer.

Figure 1:
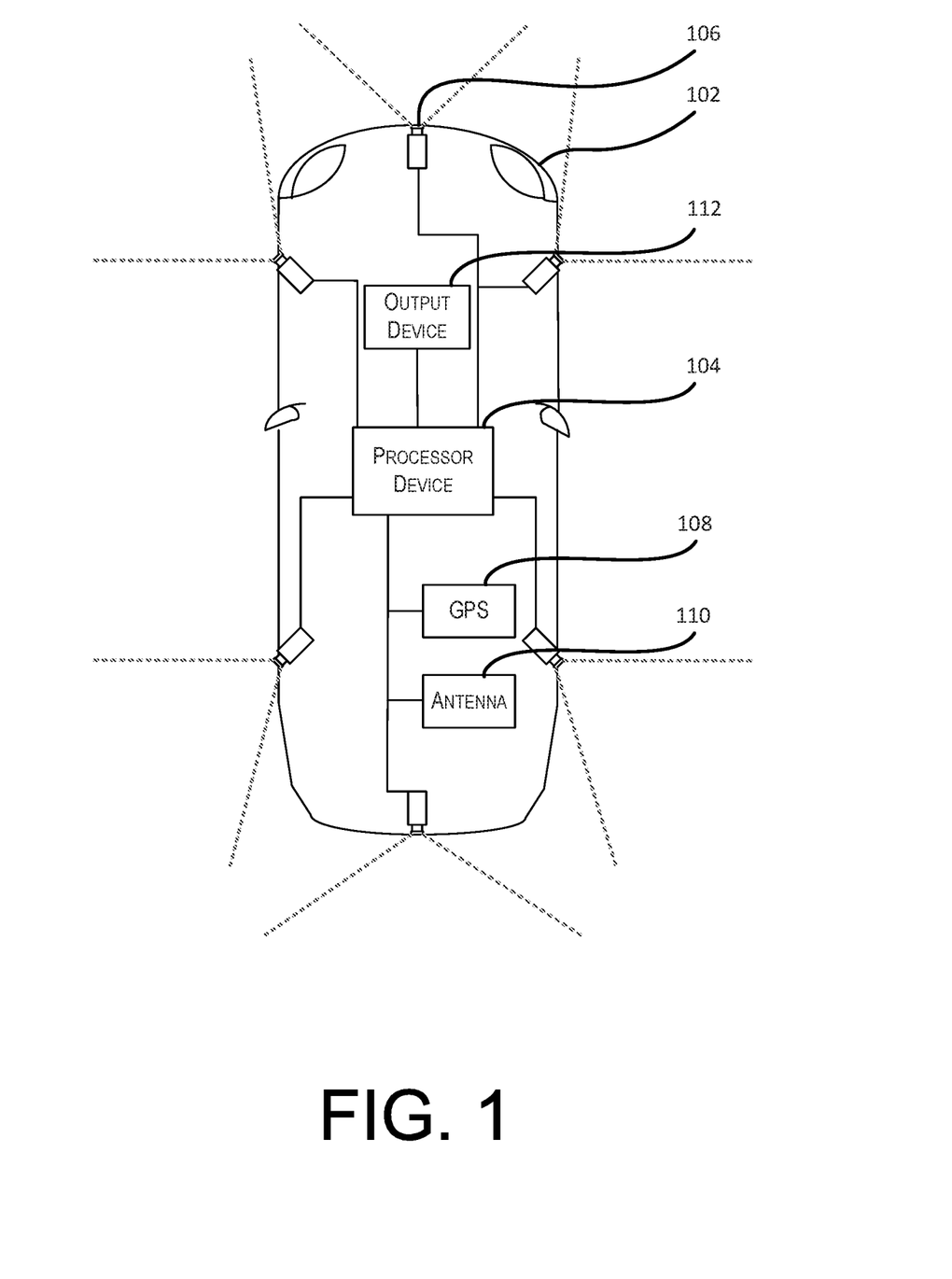
FIG. 1 depicts an onboard system for a vehicle capable of determining a vehicle identifier in accordance with at least some embodiments.

FIG. 1 depicts an onboard system for a vehicle 102 capable of determining a vehicle identifier in accordance with at least some embodiments. The onboard system 102 may include a number of input sensors capable of collecting various types of input. In addition, the onboard system may contain a processor device 104 configured to process information obtained by one or more of the input sensors included in the system.

In accordance with at least some embodiments, the input sensors included in the onboard system may comprise one or more camera devices 106 mounted at various angles on a vehicle. For example, the camera devices 106 may be configured to capture image information from one or more angles surrounding the vehicle with the onboard system. The input sensors of the onboard system may include a number of additional input sensors, such as, a global positioning system (GPS) device 108, or any other suitable type of input sensor. A global positioning system 108 may be any device capable of detecting a geographic location of the vehicle in which the onboard system is installed.

In some embodiments, a vehicle may be capable of self-identification. For example, a vehicle may be fitted with a radio frequency identifier (RFID) tag or other wireless identifier. It is envisioned that the RFID tag may be utilized in various scenarios in which vehicle identification is necessary (e.g., to pay freeway tolls). In some embodiments, the onboard system may include an input sensor that acts as an RFID reader configured to identify one or more vehicles within its vicinity.

Additionally, the onboard system may include an antenna device 110 capable of enabling communication between the onboard system and a service provider computer. For example, the antenna device may be any device capable of enabling communication with a service provider computer external to the onboard system.

The onboard system may include one or more output devices 112 capable of providing a notification to an operator of the onboard system. In some embodiments, the output devices 112 may include a speaker and the notification may be provided as an audio notification. In some embodiments, the output devices may include a display device and the notification may be provided as a visual notification. For example, the notification may be provided as text and/or an image of a target vehicle on the on the display screen of the display device.

Figure 2:
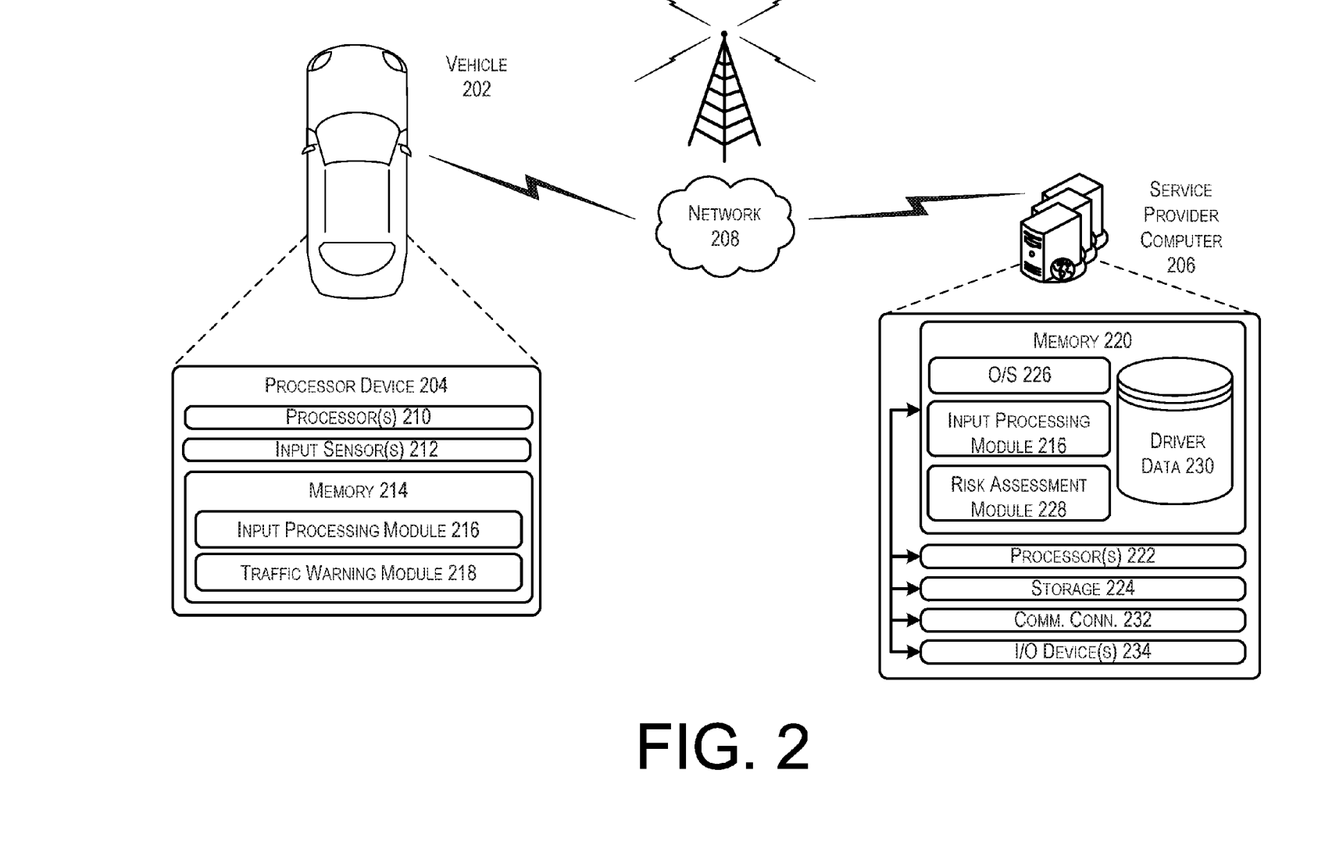
FIG. 2 depicts system or architecture in which techniques for determining a vehicle identifier and warning a driver of a potentially dangerous vehicle may be implemented in accordance with the disclosure.

FIG. 2 depicts system or architecture in which techniques for determining a vehicle identifier and warning a driver of a potentially dangerous vehicle may be implemented in accordance with the disclosure. In some examples, a vehicle 202 may include a processor device 204. In some embodiments, the processor device 204 may be configured to communicate with a service provider computer 206 via a network 208, or via other communication connections. The processor device 204 or the service provider computer 206 may be configured to process an image received from a camera mounted on the vehicle and determine a vehicle identifier associated with the vehicle. Upon determining a vehicle identifier, the service provider computer 206 may query a driver database to identify a risk associated with the identified vehicle identifier.

The processor device 204 may be any type of computing device capable of performing the described functions. The processor device 204 may include one or more processors 210 capable of processing input from one or more input sensors 212. As is known in the art, there are a variety of input sensors 212 capable of detecting input related to a user or vehicle conditions, such as accelerometers, cameras, microphones, etc. The input obtained by the input sensors may be from a variety of data input types, including, but not limited to, audio data, visual data, or biometric data. Programmatic code for an application or module utilized in the implementation of at least some embodiments may be stored and executed from the memory 214 of processor device 204. The processor device 204 may include a module for processing image information to identify a vehicle (input processing module 216) and/or a module for providing an indication of driver behavior (traffic warning module 218).

Turning to the contents of the memory 214 in more detail, the memory 214 may include the one or more application programs or services for implementing the features disclosed herein, including an input processing module 216 and/or a traffic warning module 218.

In some embodiments, an input processing module 216 may be configured to receive input information from one or more input sensors and identify a target vehicle and/or driver associated with the captured input. For example, the input sensors may be digital camera devices used to capture an image of the target vehicle to be identified. In some embodiments, the image data may comprise video data. The input processing module 216 may process the image to identify a depiction of a license plate within the captured image. Upon identifying a license plate, the input processing module may utilize one or more image processing techniques to translate a vehicle identifier (e.g., a license plate number) associated with the target vehicle from the image into text. The input processing module may capture location information associated with one or more vehicles over a period of time. In some embodiments, the input processing module 216 may be configured to calculate a direction and speed of the target vehicle and/or a distance between the onboard vehicle system and the target vehicle.

In some embodiments, a traffic warning module 218 may be configured to provide an indication to an operator of the onboard system of potentially dangerous drivers in the vicinity.

In some embodiments, the traffic warning module 218 may be configured to provide an indication of the identified target vehicle to the operator of the onboard system. In some embodiments, the traffic warning module 218 may be configured to provide a recommendation for avoiding the target vehicle or mitigating a risk associated with driving near the target vehicle.

In some examples, the network(s) 208 may include any one or a combination of many different types of networks, such as cable networks, the Internet, wireless networks, cellular networks, and other private and/or public networks. It is also noted that the described techniques may apply in other client/server arrangements, as well as in non-client/server arrangements (e.g., locally stored applications, peer-to-peer systems, etc.). In an exemplary embodiment, the processor device 304 may communicate with a network hub using one or more wireless communication networks (e.g., 3G, 4G, etc.). The network hub may, in turn, utilize a physical connection (e.g., copper cable, T1, Ethernet, etc.) to communicate with the service provider computer at a network address.

The service provider computer 206 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that, in some embodiments, the service provider computer 206 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service provider computer 206 may include at least one memory 220 and one or more processing units (or processor(s)) 222. The processor(s) 222 may be implemented as appropriate in hardware, computer-executable instructions, firmware or combinations thereof. Computer-executable instruction or firmware implementations of the processor(s) 222 may include computer-executable or machine executable instructions written in any suitable programming language to perform the various functions described.

The memory 220 may store program instructions that are loadable and executable on the processor(s) 210 and/or processor(s) 222, as well as data generated during the execution of these programs. Depending on the configuration and type of service provider computer 206, the memory 220 may be volatile (such as random access memory (RAM)) and/or non-volatile (such as read-only memory (ROM), flash memory, etc.). The service provider computer 206 may also include additional storage 224, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 220 may include multiple different types of memory, such as static random access memory (SRAM), dynamic random access memory (DRAM) or ROM. Turning to the contents of the memory 220 in more detail, the memory 220 may include an operating system 226 and one or more application programs or services for implementing the features disclosed herein including at least a module for processing image information to identify a vehicle (input processing module 216) and/or a module for determining a level of risk associated with a vehicle based on driver behavior (risk assessment module 228). The memory 220 may also include driver data 230, which provides data related to driver behavior. In some embodiments, the driver data 230 may be stored in a database.

The memory 220 and the additional storage 224, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the processor device 204 or the service provider computer 206. The service provider computer 206 may also contain communications connection(s) 232 that allow the service provider computer 206 to communicate with a stored database, another computing device or server, user terminals, and/or other devices on the network(s) 208. The service provider computer 206 may also include input/output (I/O) device(s) and/or ports 234, such as for enabling connection with a keyboard, a mouse, a pen, a voice input device, a touch input device, a display, speakers, a printer, etc.

Turning to the contents of the memory 220 in more detail, the memory 220 may include an operating system 226, a database containing driver data 230, and the one or more application programs or services for implementing the features disclosed herein, including an input processing module 216 and/or a risk assessment module 228.

In some embodiments, the risk assessment module 228 may be configured to receive an indication of a vehicle identifier from the input processing module 216, query driving behavior associated with the vehicle identifier, and determine a potential risk associated with the target vehicle. For example, upon receiving a license plate number associated with a target vehicle from the input processing module 216, the risk assessment module 228 may query the driver database 230 for the license plate number. Upon determining that the target vehicle is associated with several incidents of anomalous driving behavior, the risk assessment module 228 may assign a high level of risk to the target vehicle. In some embodiments, the risk level assigned to the target vehicle may be dependent upon the types and/or dates of anomalous driving behavior exhibited in the past. Upon determining a risk level associated with the target vehicle, the risk assessment module 228 may be configured to provide the determined risk level (and an indication of the target vehicle) to the processor device 204. In some embodiments, the risk assessment module 228 may be configured to provide one or more recommendations for mitigating the determined risk to the processor device 204.

As depicted in FIG. 2, the input processing module 216 may be located on, and executed from, either the memory 214 of the processor device 204 or the memory 220 of the service provider computer 206. In embodiments in which one or more of the modules are included at the service provider, the processor device 204 may transmit information obtained from the input sensors to the service provider computer 206 to be processed by the service provider. For example, the processor device 204 may provide streaming video to the service provider computer 206.

Figure 3:
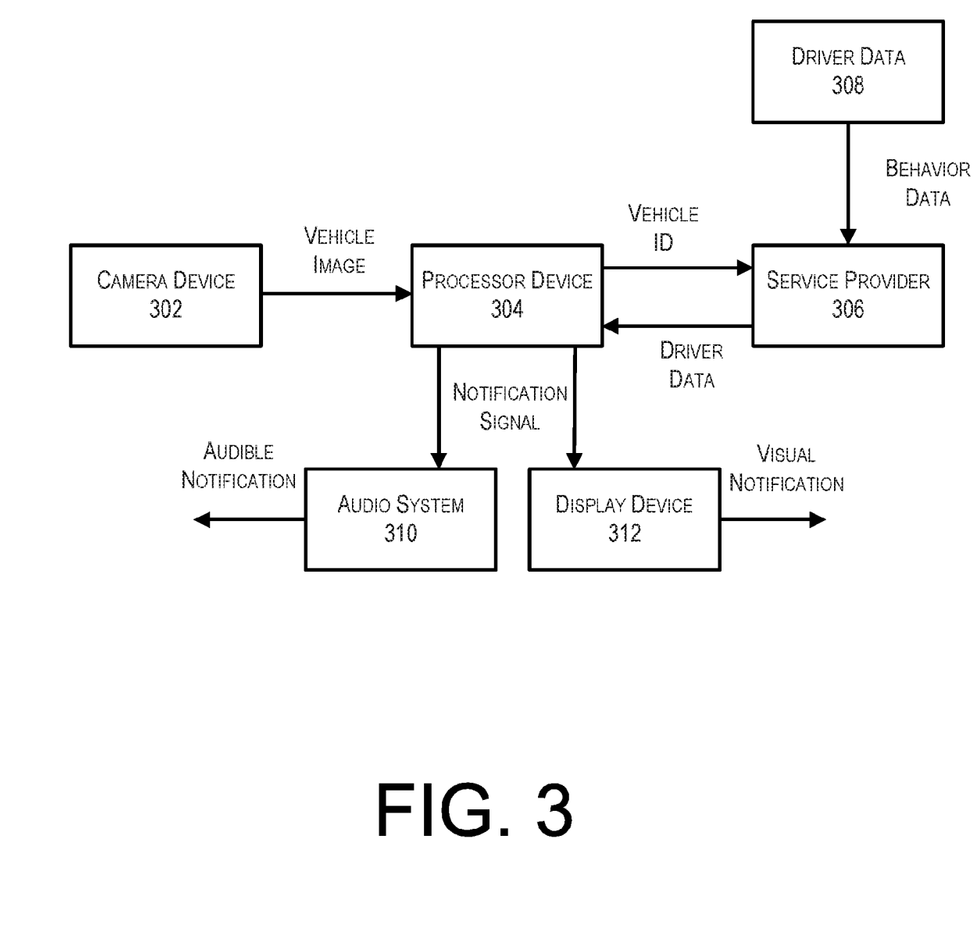
FIG. 3 depicts an illustrative flow diagram illustrating a process for gathering vehicle driver behavior data in accordance with at least some embodiments.

FIG. 3 depicts an illustrative flow diagram illustrating a process for gathering vehicle driver behavior data in accordance with at least some embodiments. In FIG. 3, an onboard system may include one or more camera devices 302. Vehicle image information captured by the one or more camera devices 302 may be processed at an processor device 304. The processor device 304 may be an example processor device 204 of FIG. 2. In some embodiments, the processor device 304 may utilize machine vision and/or one or more image processing techniques to identify a target vehicle within the captured vehicle image information. The processor device 304 may identify license plate information within the vehicle image information and may subsequently translate the license plate information into textual data using the one or more image processing techniques. In some embodiments, the processor device 304 may be configured to determine a distance of the target vehicle from the onboard system from the captured image information. In some embodiments, the input processing module may determine the speed that the target vehicle is moving with respect to the onboard system, (e.g., by tracking the vehicle's image location with respect to time) as well as the direction of the target vehicle's travel.

As the processor device 304 identifies image data from the captured vehicle image input, it may transmit one or more pieces of data to a service provider computer 306. For example, the processor device 304 may transmit a vehicle identifier for the target vehicle (e.g., the vehicle's license plate information), and/or information related to the speed of (or distance from) a target vehicle to the service provider computer 306. The service provider computer 306 may be an example service provider computer 206 of FIG. 2.

Upon receiving the vehicle identifier, the service provider computer 206 may query a driver database 308 for behavior information based on the received vehicle identifier. Upon identifying vehicle behavior information associated with the vehicle identifier, the service provider computer 306 may assess a risk level to be associated with the target vehicle. The service provider may then generate a notification or warning based on the assessed risk level. The notification generated may be a notification intended to mitigate a risk associated with the target vehicle.

The notification may be provided to the processor device 304, which may subsequently be provided to an operator of the onboard system via an output device. For example, the notification may be provided to an operator of the onboard system via an audio system 310 and/or a display device 312. In some embodiments, the onboard system may also take additional steps to mitigate a risk associated with the target vehicle.

By way of illustrative example, consider a scenario in which the service provider computer determines that the target vehicle has been associated with several incidents in the past in which the target vehicle stopped very suddenly, or in an inappropriate location. In this scenario, the service provider computer may determine that the target vehicle is prone to sudden stops. Accordingly, the service provider computer may generate a notification to maintain a greater following distance when traveling behind the target vehicle. Upon receiving the notification in the above example, the processor device may activate an audio warning to maintain a greater following distance. In addition, the processor device 304 may cause the display device to display the message "Increase your following distance" on a display screen.

FIG. 4 depicts an illustrative example of an output device in accordance with at least some embodiments. In some embodiments, the output device may be installed on a vehicle dashboard. In some embodiments, the output device may consist of multiple output components installed in various locations throughout the cab of a vehicle. As depicted, the output device may have one or more audio system components 402. For example, the audio system components may include one or more speakers positioned around the operator. The audio system components may be configured to provide an audio notification to an operator.

Figure 4A:
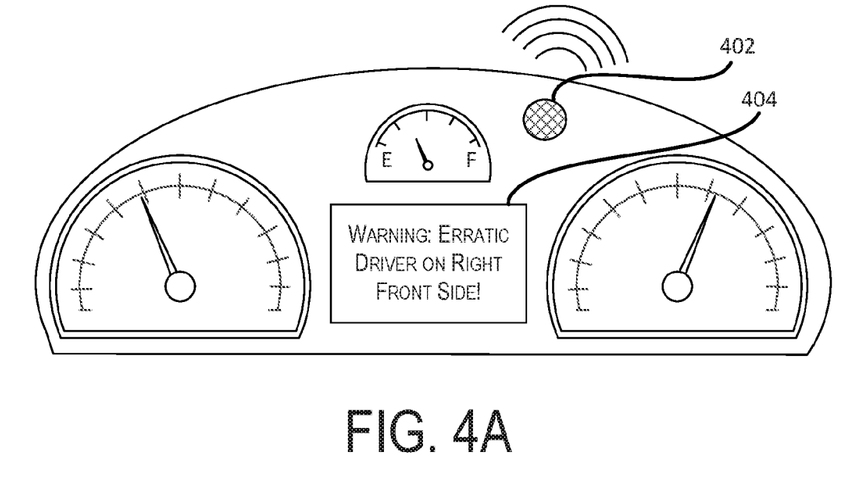
FIG. 4A and FIG. 4B depict an illustrative example of an output device in accordance with at least some embodiments.
Figure 4B:
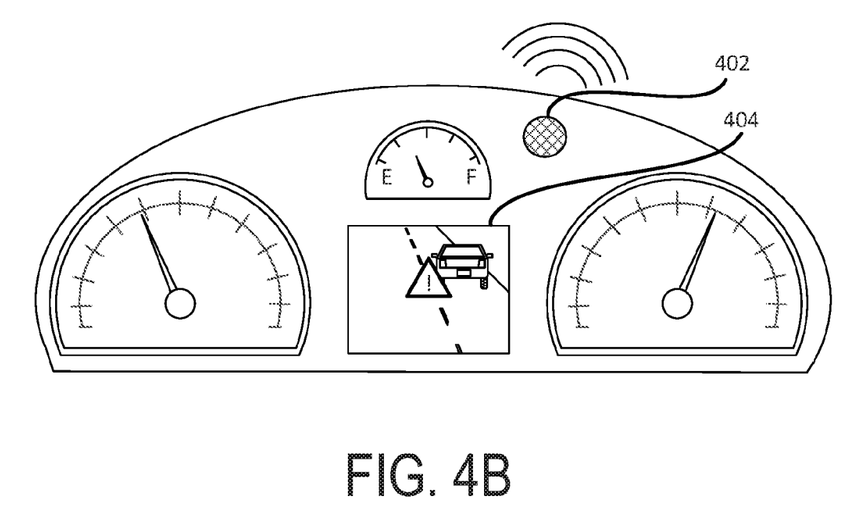

In some embodiments, an output device may include a display device 404. FIG. 4 is broken into FIG. 4A and FIG. 4B for illustrative purposes. FIG. 4A depicts an example in which the display device 404 depicts a text-based notification to an operator. FIG. 4B depicts an example in which the display device 404 depicts an image based notification to an operator.

Upon receiving a notification related to potential driving behavior, the processor device may send a signal to the output device depicted. In some embodiments, the signal may then be output by the output device to provide a notification to an operator of an onboard system. In some embodiments, the display device may depict an image that includes the target vehicle. The target vehicle may be highlighted or otherwise indicated in the image. In some embodiments, the image may be overlaid with text or symbols. In an exemplary embodiment, the onboard system may display an image of the target vehicle along with an audio notification of potential behavior that may be depicted by the target vehicle.

Figure 5:
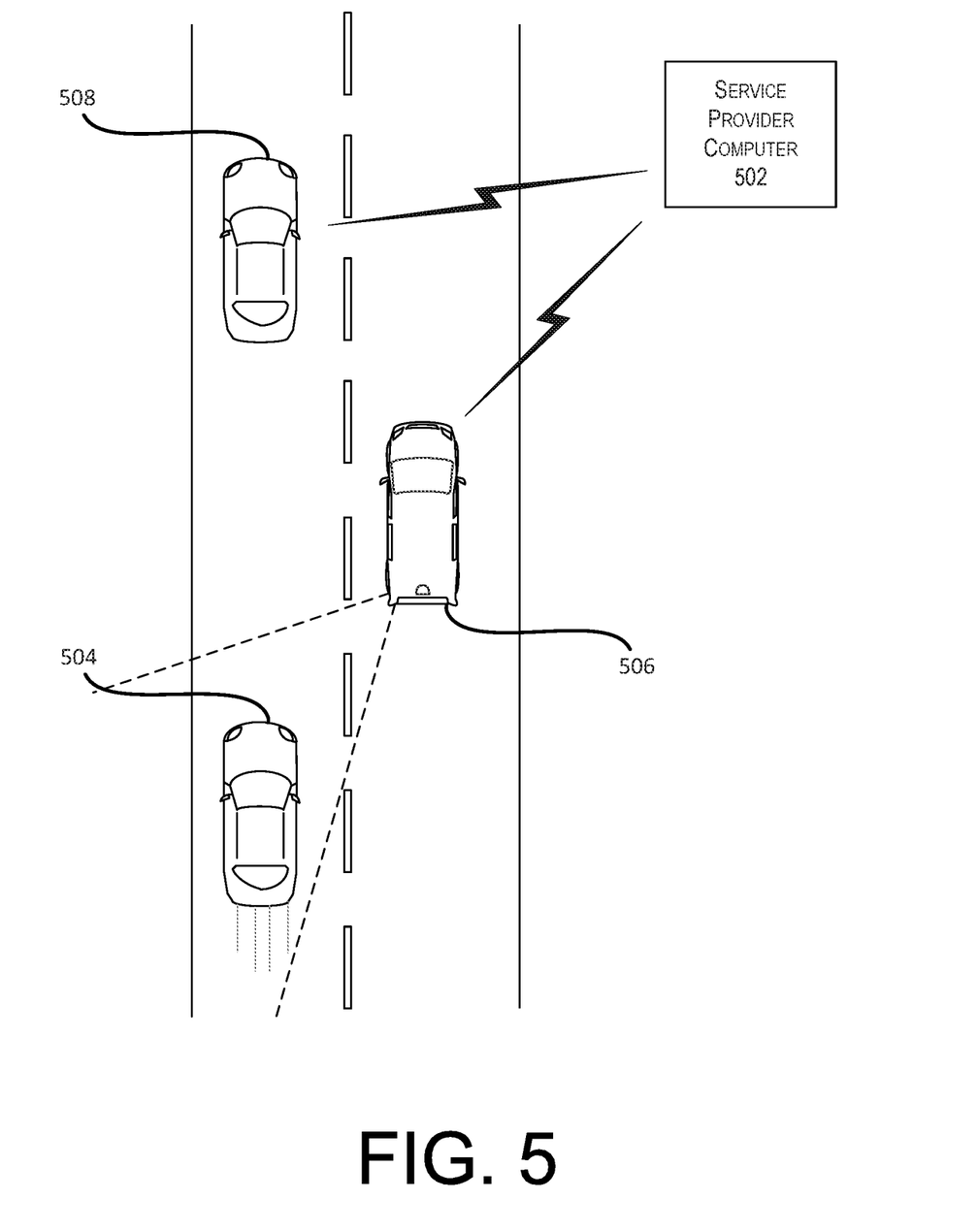
FIG. 5 depicts an illustrative example of the onboard vehicle system operating with multiple vehicles in accordance with at least some embodiments.

FIG. 5 depicts an illustrative example of the onboard vehicle system operating with multiple vehicles in accordance with at least some embodiments. In FIG. 5, a service provider computer 502 may be in communication with multiple vehicles. The multiple vehicles may transmit vehicle behavior information to the service provider. In some embodiments, each of the multiple vehicles may provide the service provider computer 502 with location data for that vehicle. For example, an onboard system installed in each vehicle may include a global positioning system device configured to acquire location coordinates. The onboard system in each of the multiple vehicles may transmit these location coordinates to the service provider computer at regular intervals.

In some embodiments, information related to anomalous vehicle behavior exhibited by a target vehicle 504 may be captured by a first vehicle 506. For example, the first vehicle 506 may include multiple camera devices configured to capture vehicle behavior information exhibited by vehicles within its vicinity. The first vehicle 506 may also be configured to transmit the information related to the captured anomalous driving behavior to the service provider computer 502.

Upon receiving information related to anomalous driving behavior from the first vehicle 506, the service provider may determine a location of the anomalous driving behavior from the location coordinates of the first vehicle 506. In some embodiments, the service provider computer may calculate a direction and/or speed of the target vehicle 504. The service provider may then identify, from location coordinate information, one or more second vehicle 508 that may be impacted by the anomalous driving behavior. The service provider 502 may provide a notification to the second vehicle 508 regarding the anomalous driving behavior and/or the target vehicle 504. For example, upon a first vehicle 506 detecting a speeding target vehicle 504, the service provider 502 may identify a second vehicle 508 in the path of the target vehicle's travel. In this example, the service provider may provide a notification to an onboard system installed in the second vehicle 508 related to the target vehicle. By way of further example, the onboard system of the second vehicle 508 may notify the driver of the second vehicle 508 that the target vehicle is approaching from the rear at a high rate of speed.

In some embodiments, the service provider computer 502 may receive coordinate information for a second vehicle 508. Upon receiving this information, the service provider computer 502 may determine if there is any anomalous driving behavior within the vicinity of the second vehicle 508. In some embodiments, a vicinity may be indicated by a predetermined distance from the onboard system. In some embodiments, the onboard system may be installed in a law enforcement vehicle. For example, a police officer may be notified that an erratic driver is within his or her vicinity.

Figure 6:
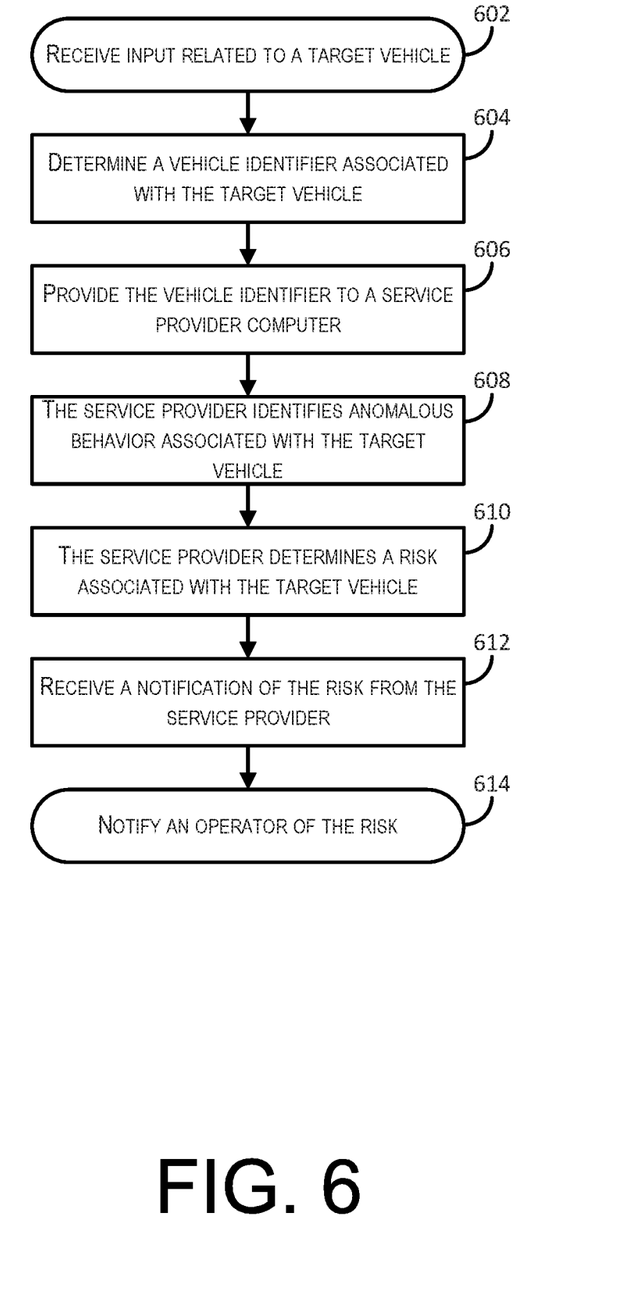
FIG. 6 depicts an illustrative flow diagram demonstrating an example onboard vehicle system configured to notify an operator of anomalous driving behavior in accordance with at least some embodiments.

FIG. 6 depicts an illustrative flow diagram demonstrating an example onboard vehicle system configured to notify an operator of anomalous driving behavior in accordance with at least some embodiments. The process 600 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 600 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 600 of FIG. 6 may be performed by at least the one or more processor devices 204 shown in FIG. 2. The code may be stored on a computer-readable storage medium, for example, in the form of a computer program including a plurality of instructions executable by one or more processors. The computer-readable storage medium may be non-transitory.

Process 600 may begin at 602, when input information is received from one or more input sensors. At 602, the input information may be image information received from one or more camera devices positioned on a vehicle. For example, an onboard vehicle system may include one or more cameras positioned on a vehicle to capture image information related to vehicle activity around the onboard system.

Upon receiving input information, the processor device of the onboard system may identify one or more vehicles in the received input information and may subsequently determine a vehicle identifier for each of the vehicles identified at 604. In some embodiments, this may be done using image processing techniques. For example, the processor device may execute an image recognition application maintained on the processor device in order to identify image patterns that correspond to vehicles. Additionally, the image recognition application may be configured to identify image patterns corresponding to license plates. In some embodiments, the image recognition application may be configured to determine a distance between an identified vehicle in the image and the camera device that captured the image. As the vehicle moves over time, the processor device may also be configured to identify a speed and/or direction that the identified vehicle is moving in.

The image recognition application may include an optical character recognition feature configured to identify a vehicle identifier for a vehicle. For example, the image recognition application may be configured to identify characters and symbols on the license plate and generate a license plate number from the image information. The vehicle license plate number may be included in a vehicle identifier generated by the processor device. Once a vehicle identifier has been generated, it may be provided to a service provider computer at 606.

Upon receiving a vehicle identifier for a target vehicle, the service provider may query a driver database to identify anomalous behavior associated with the target vehicle at 608. In some embodiments, the service provider computer may maintain multiple driver behavior databases. In some embodiments, one or more driver behavior databases may be provided by a third party entity (an entity unaffiliated with the service provider). For example, the service provider may, upon receiving license plate information for a target vehicle, query a database maintained by the department of motor vehicles to assess a driving record associated with the target vehicle. In another embodiment, a database of anomalous driving behavior may be collected by multiple onboard systems in communication with the service provider computer. In response to the query, the service provider may receive a list of anomalous driving behaviors exhibited by the target vehicle.

From the identified anomalous driving behavior associated with the target vehicle, the service provider computer may determine a risk associated with the target vehicle at 610. In some embodiments, the service provider may identify behaviors that are typical of the target vehicle. For example, the service provider may find that a target vehicle is associated with multiple speeding incidents. In this example, the service provider may determine that the target vehicle is likely to travel at an unsafe speed. In another example, the service provider may determine that the target vehicle is associated with multiple swerving incidents. The service provider may then determine that the driver of the target vehicle is prone to distraction or may tend to driver while intoxicated. Once the service provider is able to identify a potential behavior risk, the service provider may then transmit risk information to the onboard system.

The onboard system may receive the transmitted risk information from the service provider computer at 612. Based on the received risk information, the onboard system may generate a notification to an operator of the onboard system. The onboard system may cause the notification to be presented to an operator of the onboard system via an output device at 614.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An onboard vehicle apparatus installed on a vehicle, comprising:
   one or more camera devices;
   an antenna device;
   an output device; and
   a processor device configured to:
   receive input from the one or more camera devices, the input related to a target vehicle other than a vehicle in which the onboard vehicle apparatus is installed;
   determine, by the onboard vehicle apparatus based at least in part on the input related to the target vehicle, a vehicle identifier associated with the target vehicle;
   provide, via the antenna device, the vehicle identifier to a service provider computer;
   receive, in response to providing the vehicle identifier to the service provider computer, a recommendation associated with the target vehicle, wherein the service provider identifies at least one anomalous behavior exhibited in the past by the target vehicle and generates the recommendation associated with the target vehicle to mitigate a risk to the vehicle in which the onboard apparatus is installed based on a reoccurrence of the identified at least one anomalous behavior exhibited in the past by the target vehicle, wherein the recommendation includes an action to be performed by a driver of the vehicle in which the onboard apparatus is installed determined based on a type of the risk to the vehicle in which the onboard apparatus is installed; and
   provide, via the output device of the onboard vehicle apparatus, the recommendation associated with the target vehicle provided by the service provider computer.

2. The onboard vehicle apparatus of claim 1, wherein the vehicle identifier is a license plate number identified from the input received from the one or more camera devices.

3. The onboard vehicle apparatus of claim 1, wherein the risk information includes information indicating one or more behaviors determined by the service provider to be typical of the target vehicle.

4. The onboard vehicle apparatus of claim 1, wherein the output device includes an audio speaker.

5. The onboard vehicle apparatus of claim 1, wherein the output device includes a display device.

6. The onboard vehicle apparatus of claim 1, wherein the antenna is configured to enable communication between the onboard vehicle apparatus and the service provider computer via a cellular network.

7. A method of notifying an operator of a vehicle of potential risks comprising:
   receiving, at a service provider computer from one or more camera devices installed on the vehicle, input related to a target vehicle, the target vehicle being a separate entity from the vehicle;
   determining, by the service provider computer based at least in part on the input related to the target vehicle, an identifier for the target vehicle;
   determining, by the service provider computer based at least in part on the determined identifier for the target vehicle, at least one past anomalous behavior associated with the target vehicle;
   determining, by the service provider computer, a risk information associated with the target vehicle based at least in part on the at least one past anomalous behavior;
   generate, by the service provider computer, a notification regarding the risk information associated with the target vehicle that includes a recommendation specific to the target vehicle, wherein the recommendation includes an action to be performed by an operator of the vehicle based on a type of the risk associated with the at least one past anomalous behavior; and
   provide, by the service provider computer, instructions to an onboard vehicle system installed in the vehicle to cause the onboard vehicle system to relay to the operator the notification regarding the risk information associated with the target vehicle.

8. The method of claim 7, wherein the input related to the target vehicle includes image information obtained from the one or more camera devices.

9. The method of claim 8, wherein the identifier for the target vehicle is determined using one or more image processing techniques.

10. The method of claim 7, wherein the at least one at least one past anomalous behavior associated with the target vehicle includes at least one of swerving, driving erratically, driving too fast, driving too slow, and driving outside of the bounds of a road.

11. The method of claim 7, wherein the notification includes an action to be taken to mitigate a risk associated with the at least one at least one past anomalous behavior associated with the target vehicle.

12. A remote server, comprising:
   a processor device; and a memory including instructions that, when executed with the processor device, cause the system to, at least:

receive an indication of a location associated with an onboard system with which the remote server is in wireless communication;

identify, based at least in part on the received indication, at least one target vehicle within a vicinity of the onboard system, the at least one target vehicle being one in which the onboard system is not installed;

determine one or more past anomalous behaviors associated with the at least one target vehicle;

determine, based at least in part on the one or more behaviors associated with the target vehicle, a risk type associated with the target vehicle;

generate, based at least in part on the risk type associated with the target vehicle, a recommendation including instructions to an operator of the onboard system to mitigate to perform one or more actions based on the risk type associated with the target vehicle, the one or more actions determined to prevent danger to the operator based on a reoccurrence of the one or more past anomalous behaviors by the target vehicle; and provide a notification that includes the generated recommendation to the onboard system.

13. The vehicle system of claim 12, wherein the at least one target vehicle is determined to be within the vicinity of the onboard system based on the at least one target vehicle being within a predetermined distance.

14. The vehicle system of claim 12, wherein the one or more past anomalous behaviors associated with the target vehicle is detected by a second instance of the onboard system installed within a second vehicle within a vicinity of the target vehicle.

15. The vehicle system of claim 12, wherein the onboard system is installed in a law enforcement vehicle.

16. The vehicle system of claim 12, wherein the onboard system is configured to present the generated notification to an operator of the onboard system.

17. The vehicle system of claim 12, wherein the risk associated with the target vehicle is a probability that a driver of the target vehicle will engage in the one or more past anomalous behaviors associated with the target vehicle.

18. The onboard vehicle apparatus of claim 1, wherein the recommendation associated with the target vehicle is generated based at least in part on a date upon which the at least one anomalous behavior was exhibited by the target vehicle.

19. The onboard vehicle apparatus of claim 1, wherein receiving input from the one or more camera devices comprises capturing images of vehicles around the onboard vehicle apparatus, the target vehicle being one of the vehicles around the onboard vehicle apparatus.

* * * * *